J. B. ADT.
VEHICLE WHEEL.
APPLICATION FILED JAN. 11, 1910.
988,685.
Patented Apr. 4, 1911.
2 SHEETS—SHEET 1.
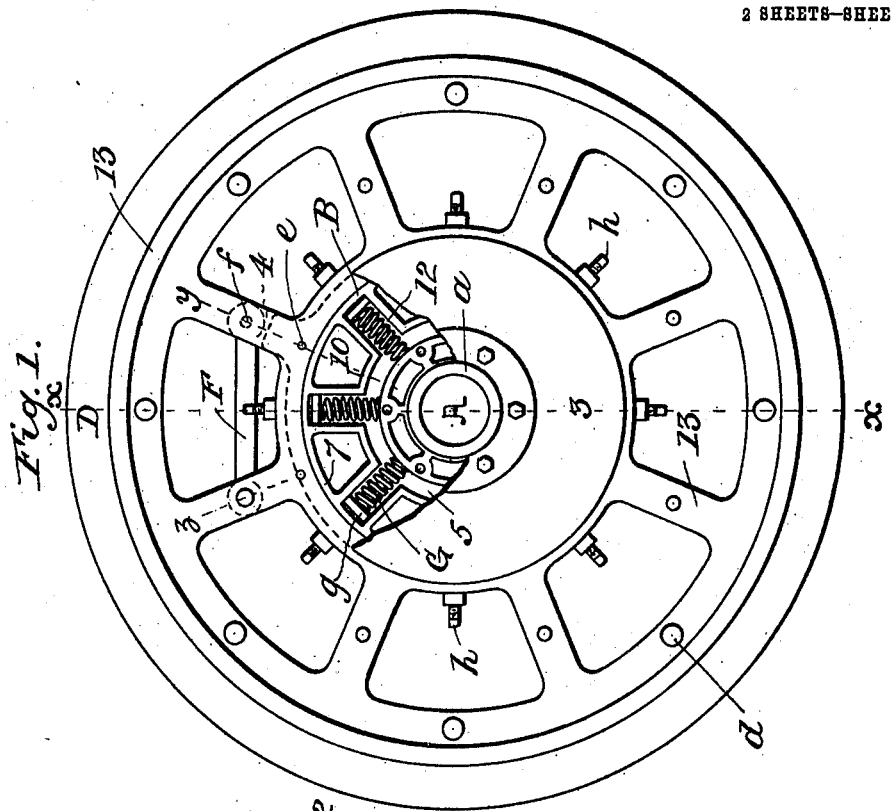
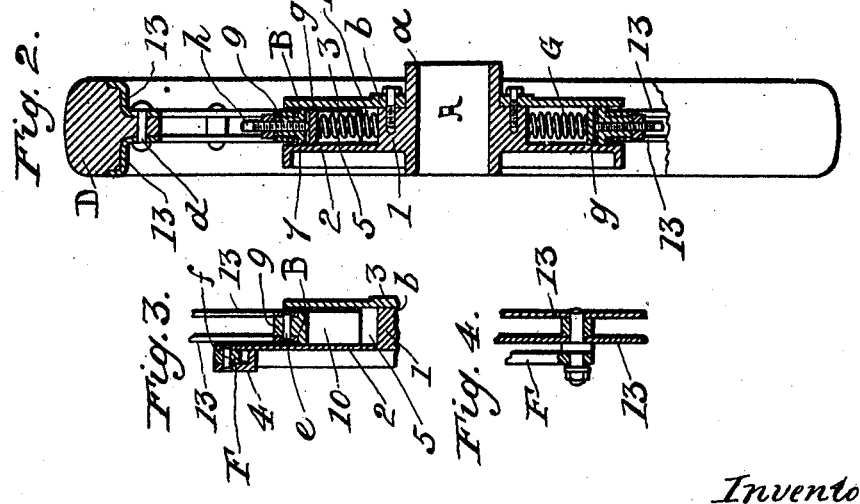
Witnesses:
Alberta Richards
Helen Nicholson Havil
Inventor
John B. Adt,
by G. H. W. T. Howard,
Atty.

J. B. ADT.
VEHICLE WHEEL.
APPLICATION FILED JAN. 11, 1910.

988,685.

Patented Apr. 4, 1911.
2 SHEETS—SHEET 2.

UNITED STATES PATENT OFFICE.

JOHN B. ADT, OF BALTIMORE, MARYLAND.

VEHICLE-WHEEL.

988,685.     Specification of Letters Patent.     Patented Apr. 4, 1911.

Application filed January 11, 1910. Serial No. 537,444.

*To all whom it may concern:*

Be it known that I, JOHN B. ADT, of the city of Baltimore and State of Maryland, have invented certain Improvements in Vehicle-Wheels, of which the following is a specification.

This invention relates to certain improvements in that class of vehicle wheels which embrace a cushioned rim which is held normally concentric with its hub by means of springs, and which are intended to have substantially the same result as regards the smooth running of the vehicle to which they are applied, as wheels provided with pneumatic tires; and the said invention consists in a peculiar construction of the various parts of the wheel, and particularly to the means employed whereby circumferential motion of the rim is communicated to the hub, or a similar movement of the hub to the rim, as will hereinafter fully appear.

In the further description of the said invention which follows reference is made to the accompanying drawing forming a part hereof and in which,—

Figure 1 is a side or face view of the improved wheel with a part thereof torn away. Fig. 2 is a partly sectional view of the wheel taken on the dotted line $x$—$x$ Fig. 1. Fig. 3 is a section taken on the dotted line $y$ Fig. 1. Fig. 4 is a section taken on the dotted line $z$ Fig. 1. Figs. 5 to 8 inclusive, illustrate details of the wheel, hereinafter described.

Referring now to Figs. 1 to 8, of the drawings, A is the hub of the wheel. The hub is shown as detached from the other parts of the wheel, in Figs. 5 and 6 which are respectively, a partly sectional face view, and a section taken on the dotted line $x^2$—$x^2$. Referring particularly to the latter figures, it will be seen that the hub consists of the cylindrical boss 1 having the flange 2, and the annular follower plate 3 which is placed upon the part $a$ of the boss which is reduced in diameter to form the shoulder $b$, and secured by screws.

4 is a lug projecting from the edge of the flange 2, for a purpose hereinafter set forth.

Figure 6:
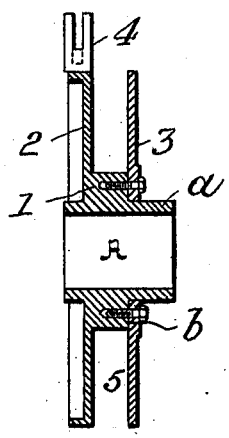
Figure 5:
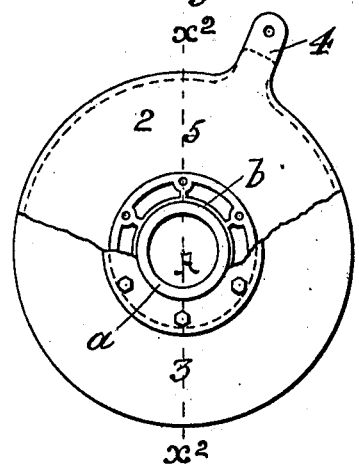
Figure 8:
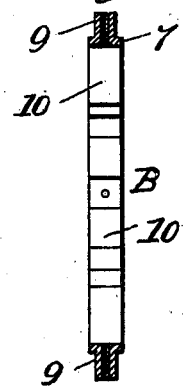
Figure 7:
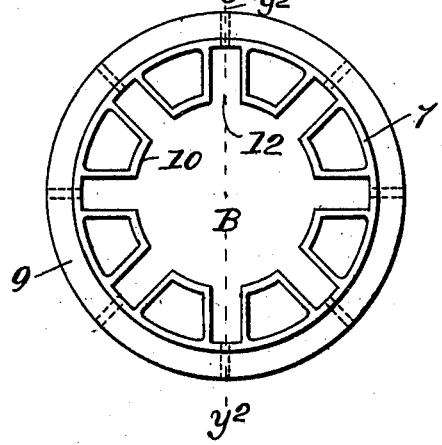

By means of the construction described, there is produced in the hub, the annular space 5 in which is placed a loose ring B, shown detached in Figs. 7 and 8 which are respectively a face view, and a section taken on the dotted line $y^2$—$y^2$. The ring B is formed of the cylindrical portion 7, the exterior central flange 9, and the inwardly extending hollow sectoral projections 10 which are separated to produce the pockets 12.

D is the flexible tread of the wheel formed preferably of rubber, and it is united to the central flange 9 of the ring B by the annular sheet steel skeleton plates 13 which are flanged at their outer edges to produce the rim in which the tread is inserted and fastened by the rivets $d$. The rivets which secure the plates 13 to the ring B are denoted in Figs. 1 and 3 by $e$.

By means of the construction described it will be understood that the tread D, the annular plates 13 and the ring B constitute practically, a single piece, and when the said ring is in the space 5 in the hub the whole is susceptible to a circumferential and diametrical motion with respect to the hub.

To complete the construction of the wheel it is necessary that circumferential motion of the rim and tread, should be communicated to the hub, or movement of the hub in a similar direction, be imparted to the rim, and this is effected by means of the link F which at one end is pivoted at $f$ to the lug 4 on the hub A, as shown in Figs. 1 and 3, and at the other end hinged to the plates 13 as shown in Figs. 1 and 4. It must be understood that the link F while effecting a common circumferential movement of the rim and the hub of the wheel, does not prevent a diametric motion of the rim toward and from the hub. This motion has to be availed of in carrying out the present invention, but the same is so controlled that while the two elements of the wheel are normally concentric, they are susceptible of being made eccentric by externally applied force, and will again assume the concentric state when the said force is removed. To effect this result, I connect the inner surface of the ring B with the outer surface of the hub A by a multiplicity of compressed open coiled springs G. These springs while under endwise compression, are inserted in the pockets 12 before the annular follower plate 3 is placed on the part $a$ of the boss 1 of the hub; and between the outer ends of the springs and the inner circumference of the ring B are inserted the square washers $g$.

To equalize the tension on the springs G and thereby centralize the hub, or for the purpose of increasing or decreasing the uniform tension on the said springs, I employ the screws $h$ which extend through threaded holes in the ring B and bear at their inner ends on the washers g.

From the foregoing description it will be understood that in view of the linked connection between the rim and the hub of the wheel, the springs G in the operation of the wheel are not subjected to any strain except in an endwise direction.

I claim as my invention,—

A vehicle wheel which consists of a hub having an annular space therein which extends outward to its periphery, and a ring situated in the said space having inwardly extending projections to form pockets of uniform width, combined with coiled springs of a common diameter throughout their length which are seated in the pockets and serve to connect the inner surface of the ring with the hub at the bottom of the annular space, a rim, plates which clamp the rim and connect the same with the said ring to which they are secured, and a vibratory link which is pivoted to the plates and the hub, substantially as specified.

JOHN B. ADT.

Witnesses:
WM. T. HOWARD,
JOS. H. THOMAS.

---

Copies of this patent may be obtained for five cents each, by addressing the "Commissioner of Patents, Washington, D. C."